(12) United States Patent
Li et al.

(10) Patent No.: US 8,120,657 B2
(45) Date of Patent: Feb. 21, 2012

(54) IMAGE ACQUIRING DEVICE WITH POSITIONING ASSISTING FUNCTIONALITY

(75) Inventors: Chia-Hsien Li, Taipei Hsien (TW); Wei Kuo Lee, Taipei Hsien (TW); Kuo Kun Lin, Taipei Hsien (TW)

(73) Assignee: Wistron Corporation, Hsichih, Taipei Hsien (TW)

( * ) Notice: Subject to any disclaimer, the term of this patent is extended or adjusted under 35 U.S.C. 154(b) by 364 days.

(21) Appl. No.: 12/420,905

(22) Filed: Apr. 9, 2009

(65) Prior Publication Data

US 2009/0309980 A1    Dec. 17, 2009

(30) Foreign Application Priority Data

Jun. 11, 2008  (TW) .............................. 97121719 A (51) Int. Cl.
*H04N 5/225*    (2006.01)
(52) U.S. Cl. ..................... 348/207.1; 348/373
(58) Field of Classification Search ............... 348/207.1, 348/333.03, 370, 373
See application file for complete search history.

(56) References Cited

U.S. PATENT DOCUMENTS

| 2002/0171633 | A1* | 11/2002 | Brinjes | 345/168 |
| 2003/0063775 | A1* | 4/2003 | Rafii et al. | 382/106 |
| 2004/0240878 | A1* | 12/2004 | Tseng | 396/431 |
| 2005/0122488 | A1* | 6/2005 | Fernandez | 353/120 |
| 2009/0220415 | A1* | 9/2009 | Shachaf et al. | 424/1.11 |

FOREIGN PATENT DOCUMENTS

| CN | 2433658 | 6/2001 |
| JP | 11258659 | 9/1999 |

* cited by examiner

*Primary Examiner* — Gevell Selby
(74) *Attorney, Agent, or Firm* — Trop, Pruner & Hu, P.C.

(57) ABSTRACT

An image acquiring device with positioning assisting functionality is for acquiring an image of an object to be captured, and includes a positioning assisting unit and an image acquiring unit. The positioning assisting unit emits light toward a planar surface. The light forms at least one positioning mark on the planar surface. The image acquiring unit is for acquiring an image of an image acquiring region associated with the positioning mark.

9 Claims, 7 Drawing Sheets

IMAGE ACQUIRING DEVICE WITH POSITIONING ASSISTING FUNCTIONALITY

CROSS-REFERENCE TO RELATED APPLICATION

This application claims priority of Taiwanese Application No. 097121719, filed on Jun. 11, 2008.

BACKGROUND OF THE INVENTION

1. Field of the Invention

The invention relates to an image acquiring device, more particularly to an image acquiring device with positioning assisting functionality.

2. Description of the Related Art

People generally exchange business cards during business meetings for purposes of conveying and receiving contact information. However, since the number of business cards one receives over time may be vast, it is not easy to organize the cards, and it may require much time looking for desired information. In addition, if a good backup copy of the cards is not maintained, once the cards are lost, making contact would be relatively difficult.

Figure 1:
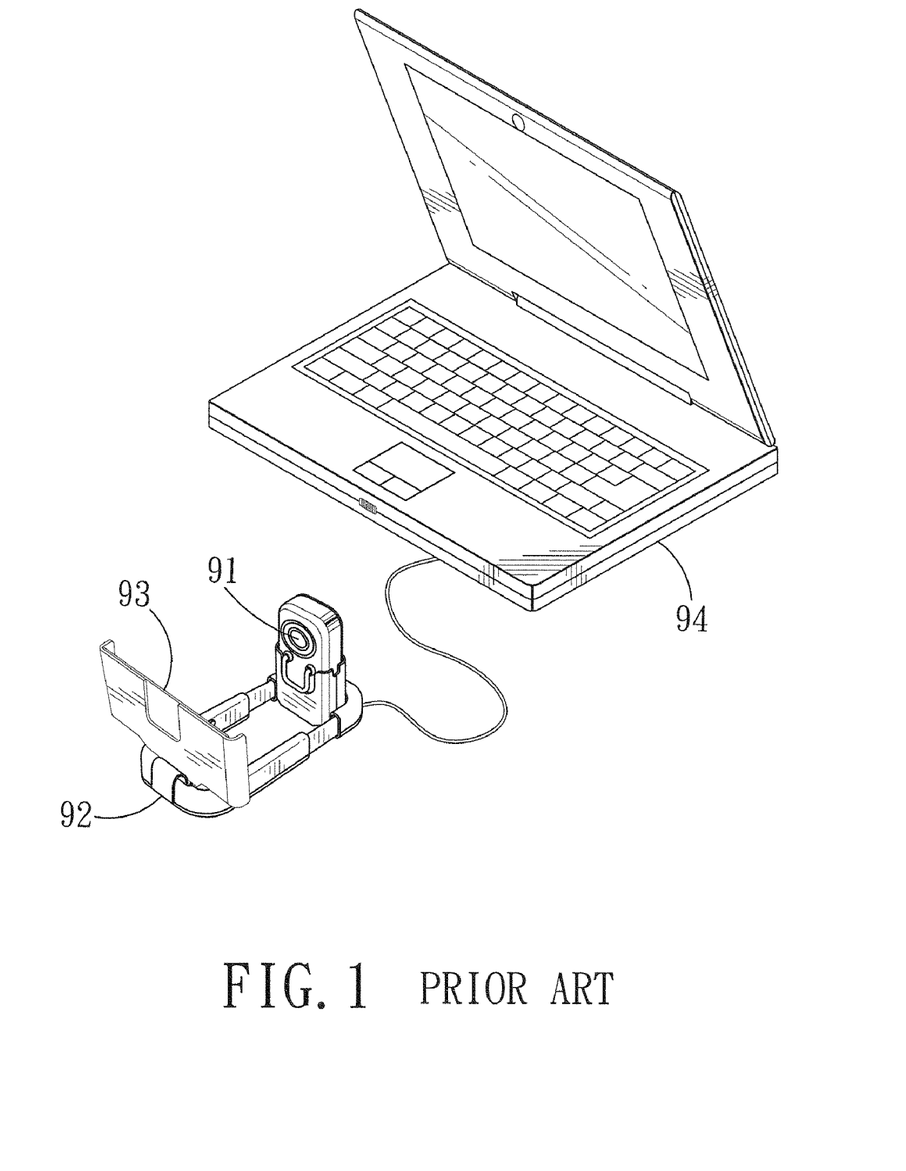
FIG. 1 is a perspective view to illustrate the relationship among components in a conventional business card scanning and recognition device.

In recent years, there has been proposed an image acquiring device, such as a charge coupled device (CCD), for use as a card scanning and recognition device. Referring to FIG. 1, an image acquiring device 91 is mounted on one side of a base 92, and a business card 93 is inserted vertically into another side of the base 92 opposite to the image acquiring device 91, such that a lens of the image acquiring device 91 is focused on the business card 93 and acquires an image of the business card 93. Subsequent processing, such as recognition, organization, etc., is carried out using a computer 94. However, since the image acquiring device 91 requires the base 92 for positioning the business card 93 in order to facilitate image acquisition, it is relatively inconvenient to carry. Moreover, the business card 93 must be inserted into the base 92 when acquiring the image thereof. The insertion, removal and positioning of the business card 93 will take up much time of the user.

SUMMARY OF THE INVENTION

Therefore, an object of the present invention is to provide an image acquiring device with positioning assisting functionality so as to permit quick positioning.

Accordingly, the image acquiring device with positioning assisting functionality of this invention is for acquiring an image of an object to be captured, and includes a positioning assisting unit and an image acquiring unit. The positioning assisting unit emits light toward a planar surface. The light forms at least one positioning mark on the planar surface. The image acquiring unit is for acquiring an image of an image acquiring region associated with the positioning mark.

The positioning assisting unit of this invention includes a single laser light source or two laser light sources. Each of the two light sources emits light to produce a positioning mark on the planar surface.

The positioning marks formed by the positioning assisting unit may be in the form of dots, L-shapes, or lines, and may be located on edges of the image acquiring region, which is disposed for positioning the object whose image is to be captured, or at opposite ends of a diagonal of the image acquiring region.

The image acquiring device with positioning assisting functionality according to this invention is built in a notebook computer, and is located on an outer frame of a screen of the notebook computer.

The image acquiring device with positioning assisting functionality according to an embodiment of the invention further includes a housing for mounting of the image acquiring unit and the positioning assisting unit thereon, and is connected externally to a computer. The effect of the present invention resides in that, by means of the image acquiring region formed on the planar surface by light emitted by the positioning assisting unit, when an image of a business card is being captured, the time the user needs to position the business card can be reduced, thereby enhancing facility and portability.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
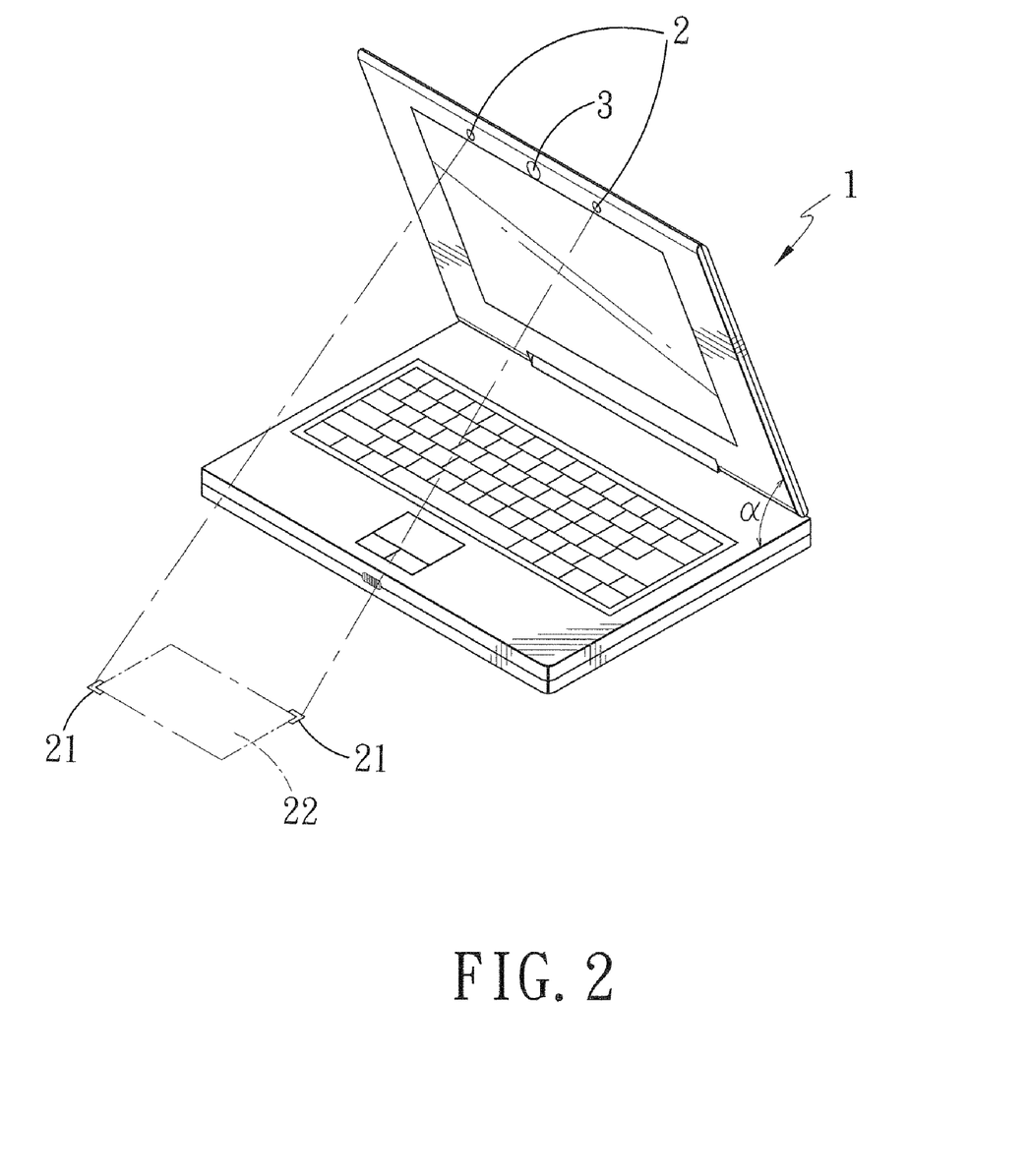
FIG. 2 is a perspective view to illustrate an image acquiring device with positioning assisting functionality according to a first embodiment of the invention.

Referring to FIG. 2, an image acquiring device 1 with positioning assisting functionality according to a first embodiment of the invention is shown to include a positioning assisting unit 2 and an image acquiring unit 3. In this embodiment, the image acquiring device 1 is built in a notebook computer, and is located on an outer frame of a screen of the notebook computer. The positioning assisting unit 2 includes two laser light sources, which respectively emit light and which respectively produce positioning marks 21 on a planar surface. The two positioning marks 21 define an image acquiring region 22. The image acquiring unit 3 (which is a camera module in this embodiment) acquires an image of the image acquiring region 22.

Figure 3:
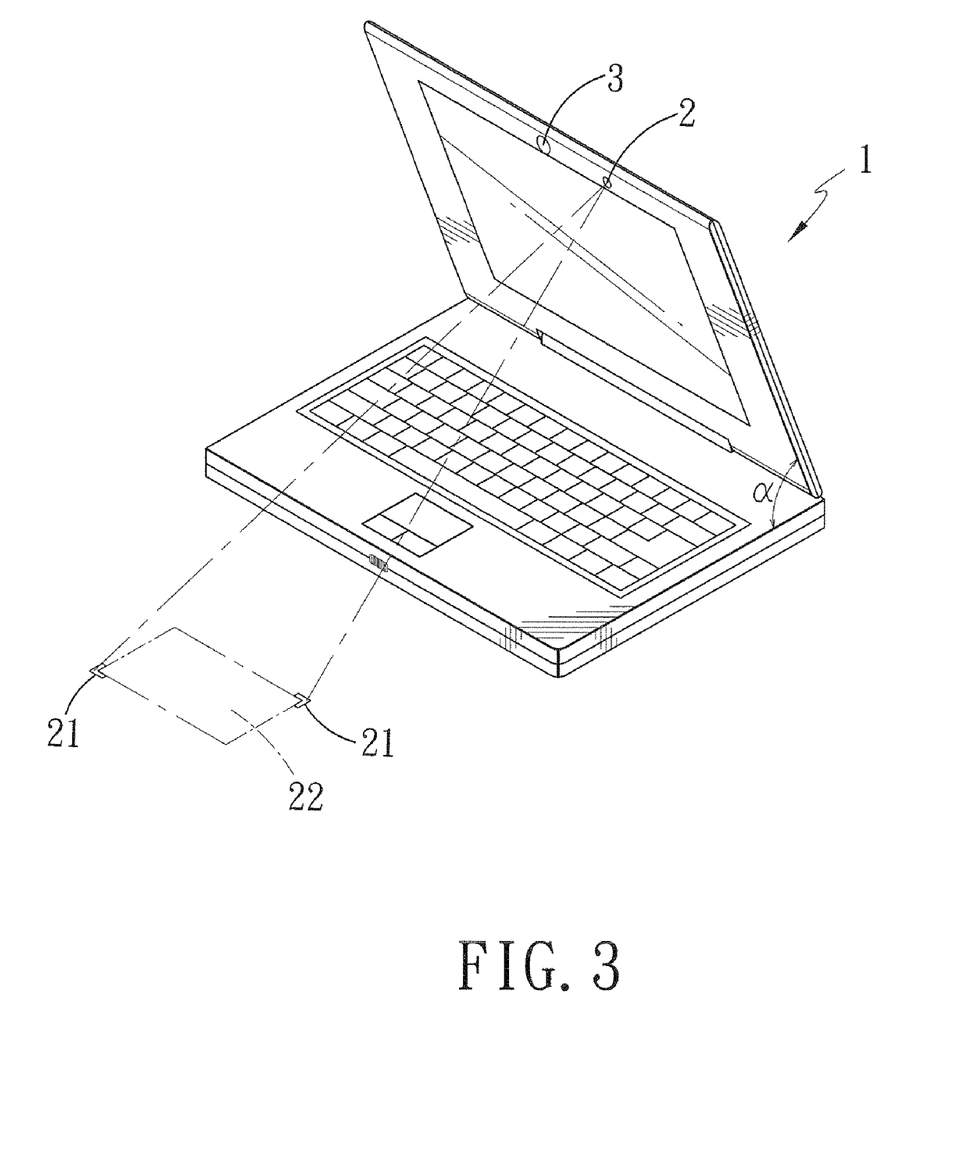
FIG. 3 is a perspective view to illustrate a modification of the first embodiment of the invention.

With reference to FIG. 3, the positioning assisting unit 2 according to this invention may be a single laser light source, which emits light that forms two positioning marks 21 on the planar surface. Therefore, the number of the light sources of the positioning assisting unit 2 and whether the number of the light sources corresponds to the number of the positioning marks 21 should not be limited to the disclosure in this embodiment. In addition, the image acquiring device 1 according to this invention is not limited to be built in a notebook computer, it may be built in a handset, an MP3 player, a personal digital assistant (PDA), or any other electronic device. In other words, the above mentioned electronic devices may be additionally provided with an image acquiring device according to this invention or may already have a conventional image acquiring device that may be combined with the positioning assisting unit 2 of this invention to constitute the image acquiring device with positioning assisting functionality of this invention.

The image acquiring device 1 of this embodiment is primarily used for capturing images of business cards. The image acquiring device 1 acquires an image of a business card and transmits the image to the notebook computer for storage therein. The notebook computer may then perform a word recognition task. In use, the notebook computer will have a positioning mechanism (not shown) for supporting the screen of the notebook computer at an angle $\alpha$ relative to a keyboard, such that the image acquiring region 22 defined by the light emitted from the two laser light sources corresponds to the size of a business card and may be in the form of an illuminated frame or an illuminated region. The image acquiring unit 3 will also change the area of image acquisition to match the image acquiring region 22 so as to acquire the image of the business card to be captured in full or in part. Certainly, the image acquiring device 1 according to this invention is used not only for acquiring images of business cards, images of post cards, greeting cards, etc., may also be acquired using the technology of the present invention, by suitably adjusting the angle $\alpha$ to change the size of the image acquiring region 22. Thus, use of the image acquiring device 1 is not limited to the disclosure of this embodiment.

Figure 4:
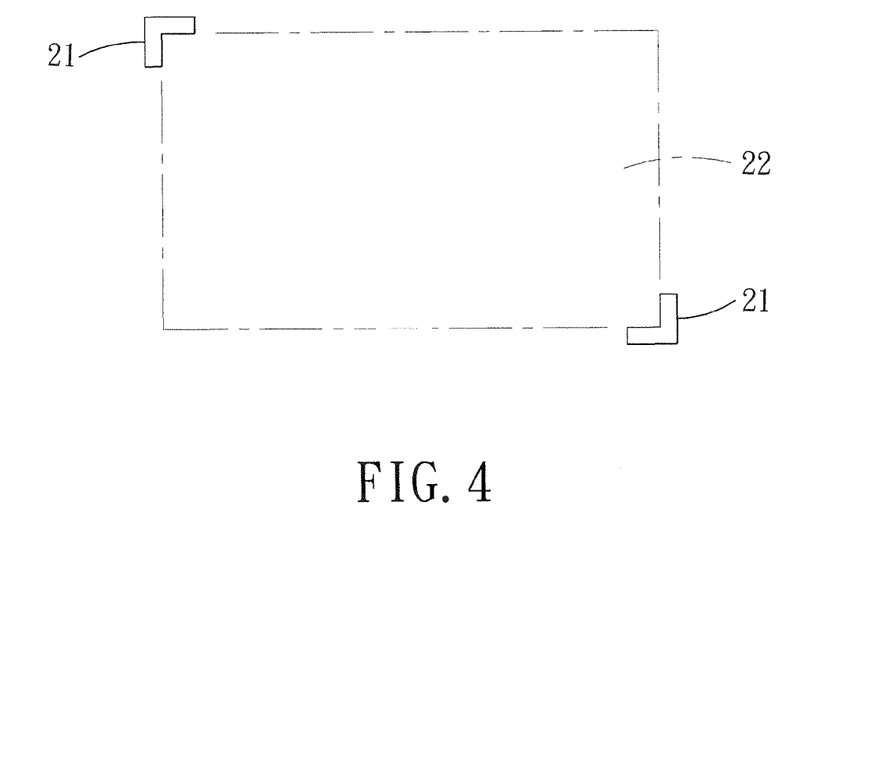
FIGS. 4 to 9 are schematic enlarged views to illustrate the relationship between various forms of positioning marks and an image acquiring region.
Figure 5:
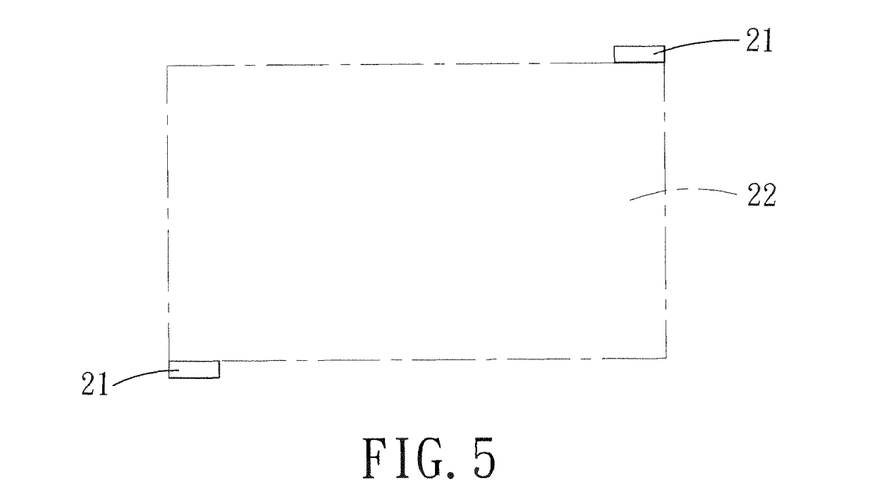

With further reference to FIG. 4, the two positioning marks 21 formed on the planar surface by the positioning assisting unit 2 of this invention are respectively located at two opposite ends of a diagonal of the image acquiring region 22. In this embodiment, the image acquiring region 22 is of the same size as a business card, and the two positioning marks 21 are respectively at two opposite ends of a diagonal of the business card. Thus, the present invention is not only easy and convenient to use, the positioning is also precise. Moreover, the cumbersome tasks of insertion, removal, etc., associated with the aforementioned prior art are eliminated, and the user's time is saved. However, the two positioning marks 21 may also be located at edges of the image acquiring region 22, as shown in FIG. 5, as long as they can help the user accurately find the proper positions, and should not be limited to this embodiment.

Figure 6:
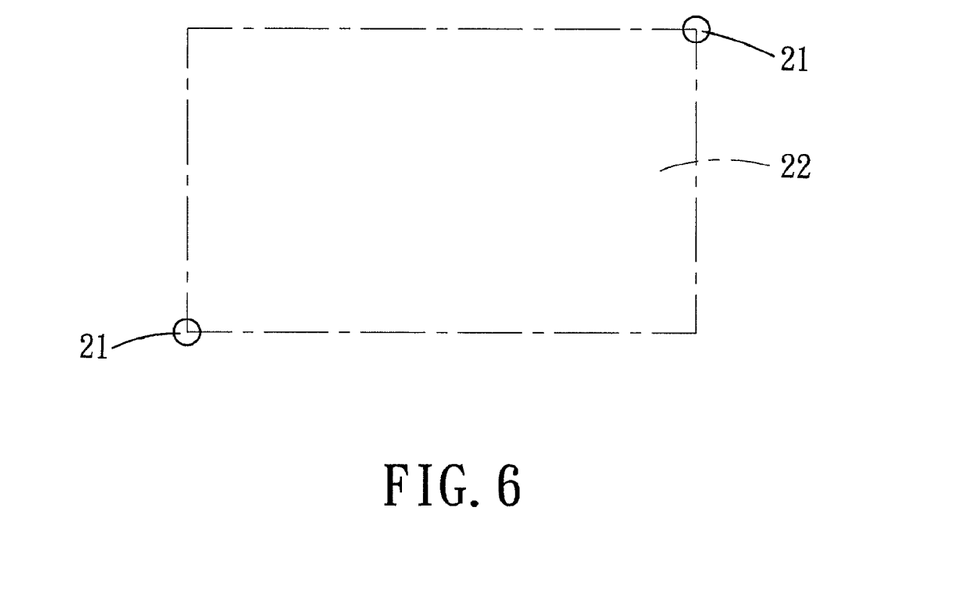
Figure 7:
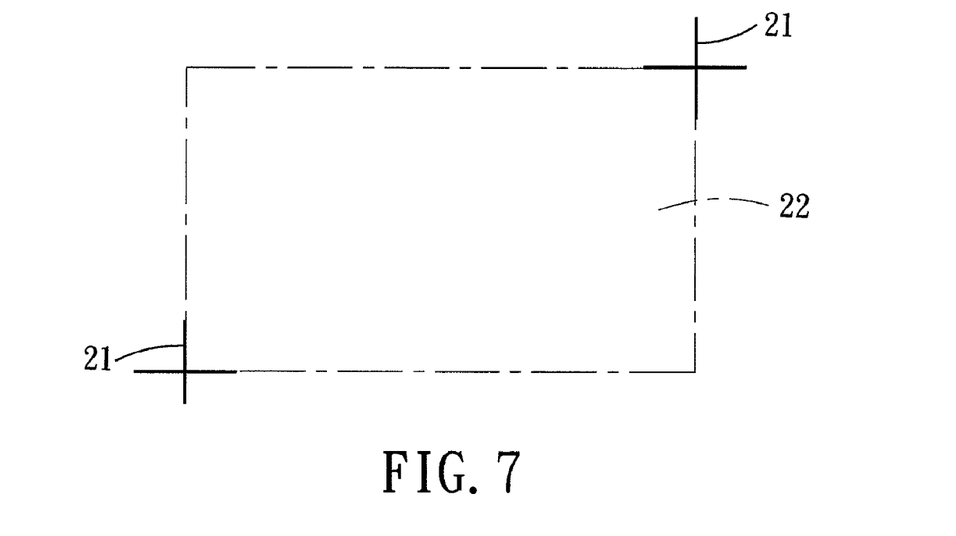

With further reference to FIGS. 4, 6 and 7, the positioning marks 21 formed on the planar surface by the positioning assisting unit 2 of this invention may be dots, L-shapes that match right-angle corners of a rectangular business card, or even lines, which may be located at edges of the image acquiring region 22, and are therefore not limited to the L-shapes exemplified in this embodiment.

Figure 8:
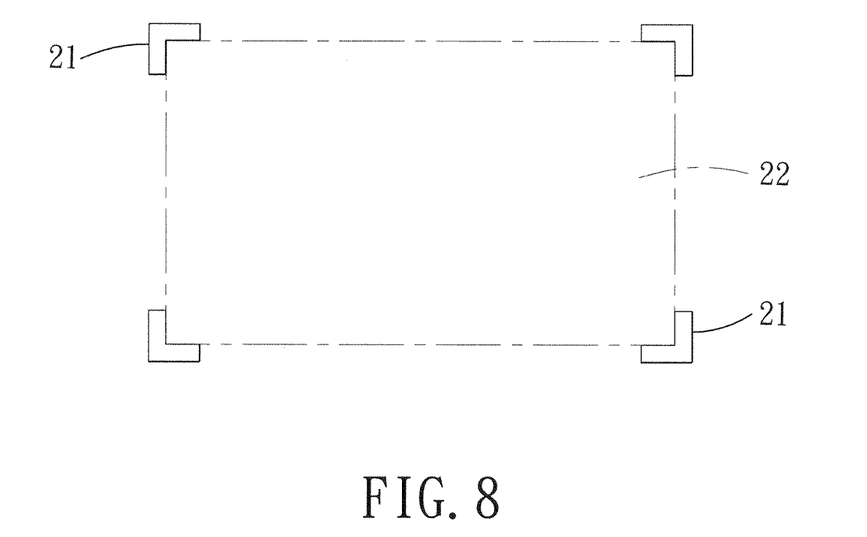
Figure 9:
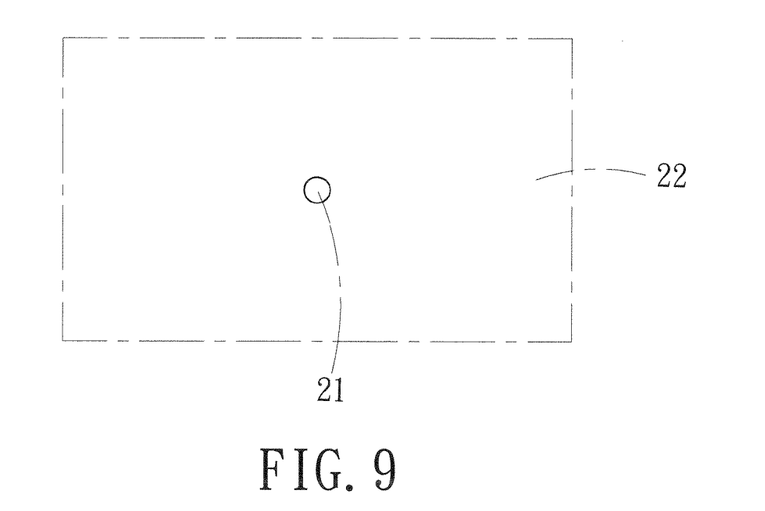

With further reference to FIGS. 4, 8 and 9, the number of the positioning marks 21 formed on the planar surface by the positioning assisting unit 2 of this invention is not limited to two. A central positioning dot or four L-shapes matching four right-angle corners of a business card may be formed, as long as the image acquiring region 22 can be positively defined.

Figure 10:
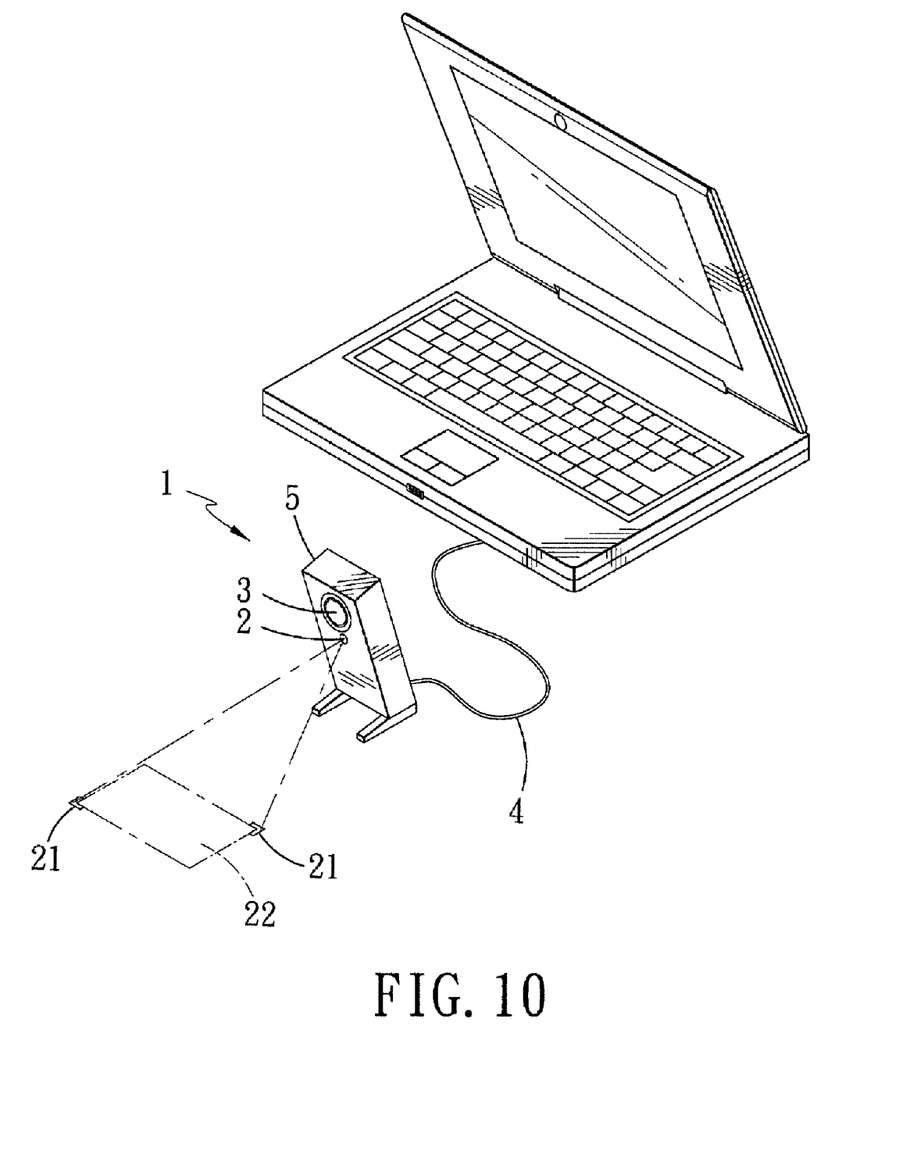
FIG. 10 is a perspective view to illustrate an image acquiring device with positioning assisting functionality according to a second embodiment of the invention.

Referring to FIG. 10, an image acquiring device 1 with positioning assisting functionality according to a second embodiment of the invention is substantially similar to the first embodiment of the invention. The difference resides in that the image acquiring device 1 of this embodiment further includes a housing 5 for mounting of the image acquiring unit 3 and the positioning assisting unit 2 thereon. The entire image acquiring device 1 is connected externally to the notebook computer through a transmission line 4 or a connecting port, or is connected externally to an electronic device, such as a conventional personal computer. After the image acquiring device 1 has acquired an image in the image acquiring region 22, the image is transmitted via the transmission line 4 to the notebook computer for subsequent processing and storage. As the method of positioning in this embodiment is the same as that in the first embodiment of the invention, it will not be discussed further herein for the sake of brevity.

In sum, the image acquiring device with positioning assisting functionality of this invention utilizes the light emitted onto a planar surface by the positioning assisting unit to form an image acquiring region so as to help the user quickly position an object whose image is to be captured for acquiring the image of the object. This not only simplifies the positioning operation and saves the user's time in positioning, portability as compared to the conventional business card recognition device is also enhanced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An image acquiring device with positioning assisting functionality for acquiring an image of an object to be captured, said image acquiring device comprising:
   a positioning assisting unit for emitting light toward a planar surface, the light being laser light that forms at least one positioning mark on the planar surface; and
   an image acquiring unit for acquiring an image of an image acquiring region associated with said positioning mark;
   wherein said positioning assisting unit includes two light sources, each of said two light sources emitting light to produce the at least one positioning mark on the planar surface.

2. The image acquiring device with positioning assisting functionality according to claim 1, wherein the positioning mark is located at an edge of the image acquiring region, the image acquiring region being for positioning therein the object whose image is to be captured.

3. The image acquiring device with positioning assisting functionality according to claim 2, wherein the light forms two of the positioning marks, which are respectively located at two opposite ends of a diagonal of the image acquiring region.

4. The image acquiring device with positioning assisting functionality according to claim 3, wherein the positioning marks are in the form of dots.

5. The image acquiring device with positioning assisting functionality according to claim 3, wherein the positioning marks are in the form of L-shapes.

6. The image acquiring device with positioning assisting functionality according to claim 3, wherein the positioning marks are in the form of lines.

7. An image acquiring device with positioning assisting functionality for acquiring an image of an object to be captured, said image acquiring device comprising:
   a positioning assisting unit for emitting light toward a planar surface, the light forming at least one positioning mark on the planar surface; and
   an image acquiring unit for acquiring an image of an image acquiring region associated with said positioning mark;
   wherein said image acquiring device is adapted to be built in a notebook computer, and is adapted to be located on an outer frame of a screen of the notebook computer.

8. The image acquiring device with positioning assisting functionality according to claim 1, wherein said image acquiring device is adapted to be connected externally to a computer.

9. An image acquiring device with positioning assisting functionality, comprising:
- a positioning assisting unit for emitting light toward a planar surface, the light forming an image acquiring region on the planar surface; and
- an image acquiring unit for acquiring an image of an object to be captured;
- wherein the image acquiring region is one of an illuminated region and an illuminated frame; and
- wherein said image acquiring device is adapted to be built in a notebook computer, and is adapted to be located on an outer frame of a screen of the notebook computer.

* * * * *